Figure 1:
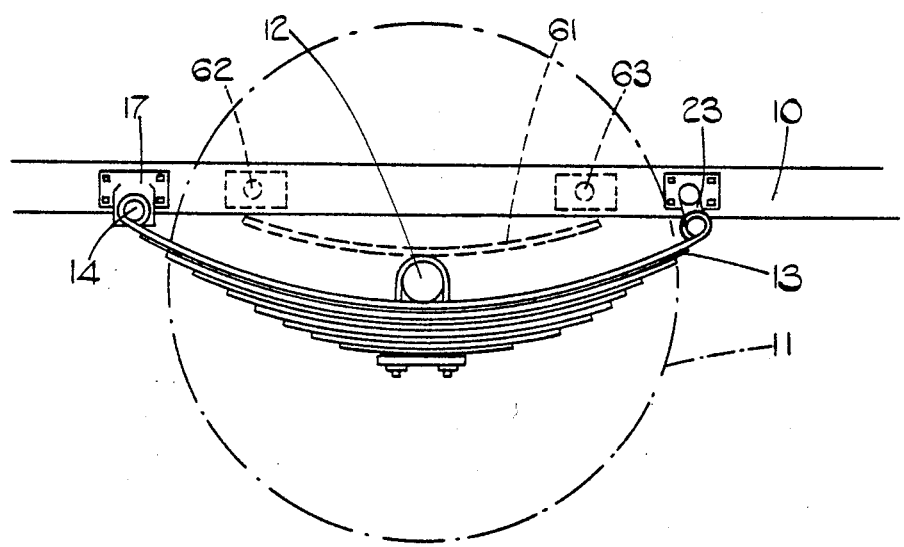

United States Patent [19]

Forrester

[11] Patent Number: 4,478,091
[45] Date of Patent: Oct. 23, 1984

[54] LOAD MONITORING ARRANGEMENT FOR A VEHICLE AXLE

[75] Inventor: John S. Forrester, Halesowen, England

[73] Assignee: Lucas Industries, Birmingham, England

[21] Appl. No.: 407,174

[22] Filed: Aug. 11, 1982

[30] Foreign Application Priority Data

Aug. 18, 1981 [GB] United Kingdom ............... 8125120
Mar. 27, 1982 [GB] United Kingdom ............... 8209083

[51] Int. Cl.³ .............................................. G01L 5/00
[52] U.S. Cl. ................... 73/862.54; 73/862.65; 177/136
[58] Field of Search ............... 177/137, 136, 211; 73/862.65, 862.66, 767, 768, 862.54

[56] References Cited

U.S. PATENT DOCUMENTS 3,389,459 6/1968 Russell ........................... 73/768 X
3,695,096 10/1972 Kutsay ......................... 73/862.66 X
3,794,130 2/1974 Malmgren et al. ............... 177/137
3,857,452 12/1974 Hartman ....................... 73/862.65 X
3,934,663 1/1976 Johansson ..................... 177/137 X

FOREIGN PATENT DOCUMENTS 1330718 9/1973 United Kingdom ............... 177/136
1577341 10/1980 United Kingdom ............. 73/862.66

Primary Examiner—Charles A. Ruehl
Assistant Examiner—Brian R. Tumm
Attorney, Agent, or Firm—Trexler, Bushnell & Wolters, Ltd.

[57] ABSTRACT

A load monitoring arrangement for a vehicle axle comprises a bolt which in use is fixedly mounted on a vehicle body and is connected with a resilient suspension part so that the body is connected with the suspension part through the intermediary of the bolt. A transducer is secured to the bolt so as to monitor the effect of loading forces acting thereon.

9 Claims, 10 Drawing Figures

LOAD MONITORING ARRANGEMENT FOR A VEHICLE AXLE

This invention relates to a load monitoring arrangement for a vehicle axle whereby the loading on a vehicle axle can be monitored.

It is important to monitor the loading on a vehicle axle to ensure that such loading does not exceed the permitted value. Furthermore, it is important for such loading to be accurately monitored so that the vehicle can be safely loaded up to its maximum permissible loading so as to provide for maximum operating efficiency. Various load monitoring arrangements have been previously proposed. In one previously proposed arrangement, transducers are either bolted or welded to the axle casing of the vehicle and measure bending stresses in the axle casing. In the case of vehicles with twin rear wheels, the point of loading is not accurately known since this varies as a result of unevenness in the road surfaces and/or differences in the inflation of the tyres. In order to overcome this, it has been proposed to use two, and possibly as many as four, transducers per axle and to monitor these differences. This, however, has the disadvantage of greatly increasing the cost and complexity of the system and also takes no account of manufacturing tolerances on the axle casing. The result of this is that a separate installation is required for each type of vehicle and individual calibration of every vehicle regardless of type is required.

In another previously proposed type of system, transducers are mounted between the axle and the vehicle chassis. These transducers monitor the spacing between the axle and the vehicle chassis and so give an indication of the degree of loading of the vehicle because the spacing decreases as the vehicle loading increases. However, the spacing between the axle and the vehicle chassis does not depend just upon the loading of the vehicle but also depends upon the length of the suspension springs. Over a period of time, the suspension springs tend to settle and so the system becomes grossly inaccurate and therefore requires frequent recalibration.

An object of the present invention is to obviate or mitigate the above disadvantages.

According to the present invention, there is provided a load monitoring arrangement for a vehicle axle, said arrangement comprising a member which in use is fixedly mounted on a vehicle body and connected with a resilient suspension part so that the body is connected with the resilient suspension part through the intermediary of said member, and a transducer secured to said member so as to monitor the effect of loading forces acting thereon.

The invention is applicable to heavy goods vehicles having a suspension in which a main spring is augmented by a helper spring and also to vehicles where such a helper spring is not provided. In the case where a helper spring is provided, the member may be associated with the helper spring or with the main spring serving as the aforesaid resilient suspension part. In some circumstances, it may be advantageous or necessary to provide a load monitoring arrangement for each main spring and each associated helper spring, and to sum the outputs from the transducer.

Said member may be a bolt and the transducer may be arranged to monitor shear forces or bending stress forces acting thereon. Alternatively, said member may be a so-called slipper plate.

The transducer is fixed on the member in such a way that the vehicle body does not act directly on the transducer. In order to provide for this, the transducer may be disposed in a recess in one member or on the member at a position which is in a recess in a part of the vehicle body through which the member passes. For example, in the case where the member is a bolt, the device may be secured to a flat on the shank of the bolt. In the case of suspension arrangements employing slipper plates where the rigidity of the slipper plates makes it difficult to measure forces thereon using a transducer it is within the scope of the present invention to modify at least part of the slipper plate to ensure that it reacts sufficiently for the forces to be accurately monitored by the transducer.

In a particularly convenient embodiment, the transducer takes the form of a strain gauge device which, most preferably, comprises a plurality of thin film strain gauges. Conveniently where said member is a bolt, the bolt has a hollow therein which receives the transducer so that the transducer is disposed within the bolt and is thereby protected.

Desirably the transducer is provided on an insert which is disposed in the hollow in the bolt so as to be in intimate contact with the bolt.

Also according to the present invention, there is provided a vehicle having a body, a plurality of axles, and a resilient suspension part connecting one end of each axle with the vehicle body, and a load monitoring arrangement comprising a member which is fixedly mounted on the vehicle body and connected with the resilient suspension part so that the body is connected with the resilient suspension part through the intermediary of said member, and a transducer secured to said member so as to monitor the effect of loading forces acting thereon.

Figure 2:
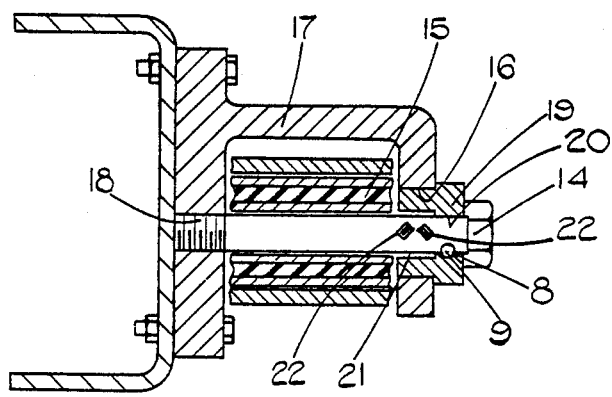
Figure 3:
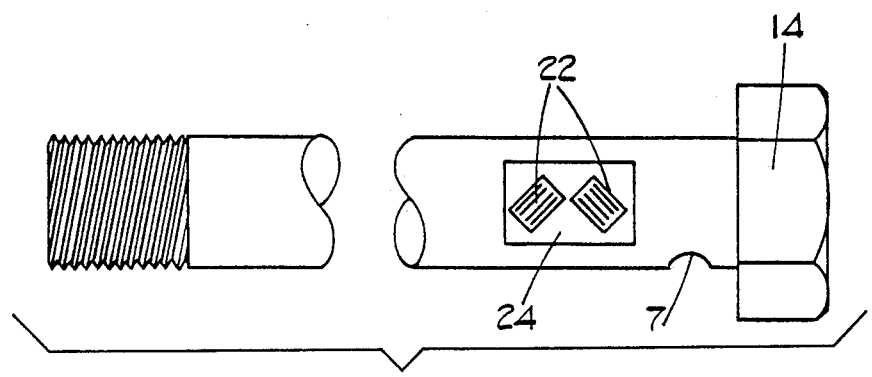
Figure 4:
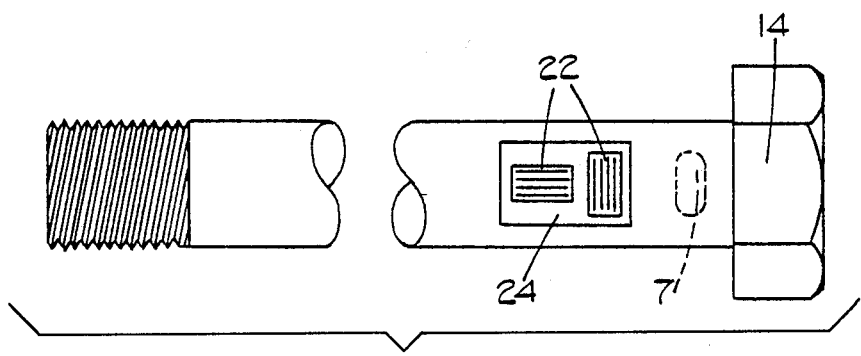
Figure 5:
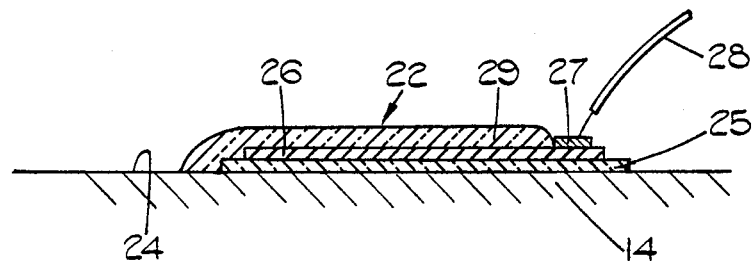
Figure 6:
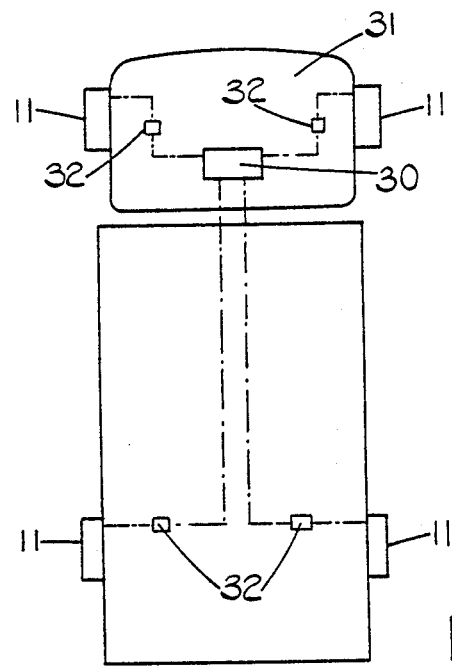
Figure 7:
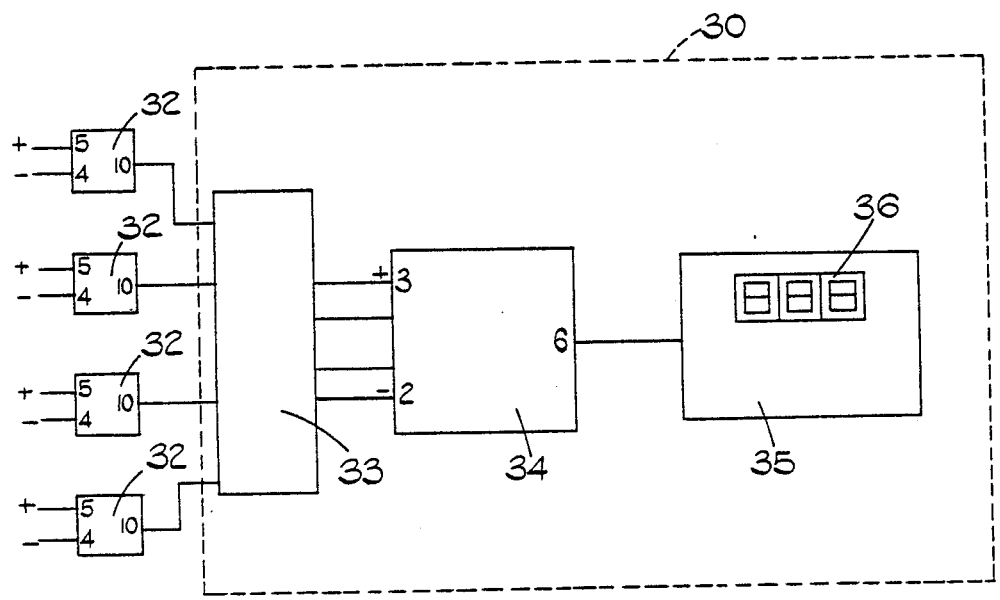

Embodiments of the present invention will now be described by way of example, with reference to the accompanying drawings, in which:

FIG. 1 is a side elevation of part of a goods vehicle,

FIG. 2 is a sectional view through part of the vehicle illustrated in FIG. 1 showing a load monitoring arrangement according to the present invention, FIG. 3 is a view on a larger scale of a bolt and a strain gauge device as illustrated in FIG. 2, FIG. 4 is a modification of FIG. 3, FIG. 5 is a cross-sectional view of a strain gauge element, FIG. 6 is a schematic plan view of a goods vehicle fitted with a plurality of load monitoring arrangements according to the present invention, FIG. 7 is a block diagram illustrating the components of an electronic module and display unit shown in FIG. 6.

Figure 8:
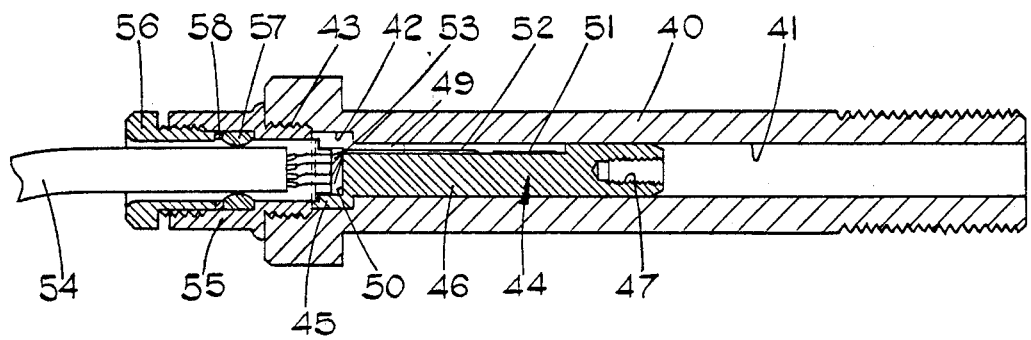
Figure 9:
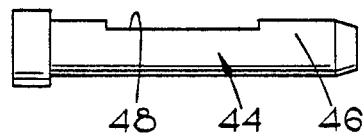
Figure 10:
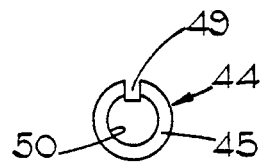

FIG. 8 is a sectional view of an alternative to the bolts illustrated in FIGS. 3 and 4, FIG. 9 is a side view of an insert of the construction of FIG. 8, and FIG. 10 is an end view of the insert of FIG. 2.

Referring now to FIG. 1 of the drawings, the vehicle illustrated therein is a road goods vehicle and has a body including a chassis 10, wheels 11 (only one shown), a pair of axles 12 (only one shown), and leaf springs 13 at each side of the body mounting the latter on the axles. One end of each leaf spring 13 is mounted on a bolt 14 through the intermediary of a composite metal and rubber bush 15 sold under the trademark METALASTIC. The bolt 14 passes with clearance through an aperture 16 in a mounting bracket 17. The mounting bracket 17, being bolted to the chassis 10, forms part of the vehicle body. The bolt 14, after passing through the opening 16, enters a recess in the mounting bracket 17 in which the bush 15 is provided and then engages in a screw-threaded hole 18 in the bracket 17. A metal bush 19 is press fit in the opening 16 and is provided with a stepped bore 20 therethrough. The smaller diameter portion of the stepped bore 20 is of a size to fit closely around the shank of the bolt 14 externally of the mounting bracket 17 so that an annular clearance 21 is provided between the metal bush 19 and the bolt 14 within the opening 16. A strain gauge device in the form of a pair thin film strain gauge elements 22 is bonded to the shank of the bolt 14 in the region of the annular clearance 21. In this way, it will be seen that the weight of the body is taken by the portion of the bolt which is engaged in the hole 18 and the portion of the shank thereof which is disposed outwardly of the mounting bracket 17. In other words, the weight of the vehicle body is not applied to the strain gauge elements 22 themselves. As can be seen from FIG. 2, the strain gauge elements 22 are disposed mutually perpendicularly and at 45 degrees to the longitudinal axis of the bolt 14 and are mounted on the side thereof.

The shank of the bolt 14 is provided with a transverse recess 7 of semi-circular cross-section in its lower surface (as viewed in FIG. 3). The metal bush 19 is provided with a transverse circular bore 8 therethrough which opens into the lower surface of the smaller diameter region of the stepped bore 20. During assembly, the bolt 14 is engaged with the hole 18 and tightened until the recess 7 coincides with the transverse bore 8, after which a pin 9 is inserted. This ensures that the elements 22 are correctly positioned within the bush 19 and that the bolt 14 is orientated so that the elements 22 are at the side of the bolt 14.

The opposite end of each leaf spring 13 to the bush 15 is mounted on the chassis 10 through the intermediary of a bush (not shown) similar to bush 15 and a shackle 23 in a manner known per se in vehicle suspensions. In this embodiment, the bolt mounting the shackle 23 on the chassis 10 is not provided with a strain gauge device. However, it is within the scope of the present invention to provide a strain gauge device on the bolt mounting the shackle 23 on the chassis 10 or, indeed, upon a bolt which secures the lower end of the shackle 23 to the leaf spring 13. In either case, the strain gauge device associated with the bolt 14 at the other end of the leaf spring 13 would not then be required.

Referring now to FIG. 3, the strain gauge elements 22 are bonded to the base of a recess provided by a flat formed on the shank of the bolt 14. The manner in which the strain gauge elements 22 are bonded to the bolt 14 will be described hereinafter.

In the above described embodiment, the strain gauge elements 22 are disposed so as to be sensitive to pure shear stresses in the bolt 14 and, because of the positioning thereof on the side of the bolt, will be independent of bending, tensile or compressive forces.

However, the invention can be realised by mounting the strain gauge elements 22 in such a way as to measure bending stresses in the bolt 14 independently of tensile, compressive or shear forces. Such an arrangement is illustrated in FIG. 4 where the strain gauge elements 22 are mutually perpendicularly disposed so that one of strain gauge elements is aligned with the bolt axis and the other element 22 is disposed perpendicularly with respect to the bolt axis. Similar strain gauge elements (not shown) are mounted in corresponding positions diametrically opposite the illustrated elements 22. In the embodiment of FIG. 4, the bolt 14 is intended to be mounted in the bracket 17 such that one set of elements 22 is disposed on the top surface of the shank whilst the other set of elements is disposed on the lower surface of the shank, as opposed to the embodiments of FIGS. 2 and 3 where the elements 22 are mounted on the side surface of the shank of the bolt 14. In the embodiment of FIG. 4, a simple, conventional bridge circuit connects the strain gauge elements 22 to cancel tensile, compressive and shear forces so that pure bending stresses are measured in the bolt 14.

Referring now to FIG. 5, each strain gauge element 22 is formed by first polishing to produce a ¼ micron scratch free surface on the flat 24 of the bolt 14 a surface where no scratches have a depth greater than ¼ micron and then depositing a 3 micron glass layer 25 on the polished surface. On this layer 25, is first deposited a layer 26, of a 80% nickel 20% chromium alloy to provide a sheet resistance of 5 ohms/square, the alloy being of the type sold under the trademark NICHROME, followed by a 0.3 micron layer of gold. Layers 25, 26 and the gold layer are formed by a radio frequency sputtering technique. The required gauge pattern is provided in the layer 26 and the gold layer by using an appropriately shaped mask and employing photolithographic and etching techniques to leave the required strain gauge pattern of the layer 26 and the gold layer on the glass substrate layer 25. Gold pads 27 (only one shown) are then formed on the etched layer 26 at the required gauge interconnection points by removal of part of the gold layer using suitable masking and etching techniques. The nickel/chromium alloy pattern is then annealed by heating to 200° C. for 2 hours. The final resistance value of 350 ohms is then achieved by laser trimming of the alloy pattern. A 3 micron glass layer 29 is deposited over the whole gauge except the gold pads 27 to act as a protection. Other forms of protective coating could, of course, be employed. Aluminum wires 28 are then bonded to the pads 27 by a heat and pressing operation, a thermosonic operation, or an ultrasonic operation.

Referring now to FIG. 6, the vehicle illustrated therein is a two axle vehicle and is provided with a strain gauge device associated with each of the four leaf spring mountings of the wheels 11. These strain gauge devices are connected to an electronic module and display unit 30 which is mounted in the cab 31. The unit 30 enables individual wheel loadings, axle loadings and gross vehicle weight to be individually displayed and therefore monitored.

Referring now to FIG. 7, four type ICL7650 chopper stabilized operational amplifiers 32 connected in the differential mode to amplify the outputs from the respective strain gauge devices are located respectively at wheel axle assemblies and the outputs from the amplifiers 32 are connected via a selector switch 33 to a type 741, four input summing amplifier 34 and thence to a type ICL7107 digital panel meter integrated circuit 35 whose output is connected to a type 586-526, seven segment, 3 digit LED display unit 36.

The selector switch 33 can be selectively operated so as to connect any one of the four differential amplifiers 32 with the summing amplifier 34 to enable individual wheel loadings to be displayed, to connect selected pairs of the differential amplifiers 32 with the summing amplifier 34 for displaying front or rear axle loadings, or to connect all four differential amplifiers 32 with the summing amplifier 34 for displaying gross vehicle weight. Also included within selector switch unit 33 are facilities to enable unladen vehicle weight to be deducted from gross vehicle weight to give actual load carried.

In the arrangements disclosed above there is a danger of damage occuring to the transducer for example during bolt fitting and/or replacement owing to the relatively exposed nature of the transducer on the bolt. FIGS. 8, 9 and 10 illustrate an arrangement wherein this possibility is minimized.

Referring to FIGS. 8, 9 and 10 the load monitoring arrangement comprises a shackle bolt 40 which is mounted on a road goods vehicle in the manner of the bolt 14 described above in relation to FIGS. 1 to 7. The bolt 40 has an axial bore 41 therethrough. In general, the ratio of the outer diameter of the shank of the bolt 40 to the diameter of the bore 41 should be such that there is no significant reduction in bending strength, for example said ratio being no less than 2:1 which will give a reduction in bending strength of 5%. In this embodiment, the outer diameter of the shank of the bolt 40 is 20 mm whilst the bore 41 has a diameter of 9 mm. At the head end of the bolt 40, the bore 41 opens into an intermediate portion 42 of increased diameter which, in turn, opens into an end portion 43 which is of even greater diameter and which is screw threaded. As can be seen from FIG. 8, the intermediate and end portions 42 and 43 of larger diameter are contained substantially within the head of the bolt. Disposed within the bore 41 is an insert 44 formed of the same high tensile steel as that from which the bolt 40 is formed so ensuring that the insert and the bolt have the same coefficient of thermal expansion and thus providing a temperature compensated assembly. The insert 44 has a head 45 which is a close fit within the intermediate portion 42, and a shank 46 which is an interference fit in the bore 41 hence partially restoring the original strength of the bolt 40. In this embodiment, the shank 46 of the insert 44 has a diameter which is 0.007 mm greater than that of the bore 41. At its end remote from the head 45, the insert 44 is externally tapered to assist in press fitting of the insert 44 into the bore 41 and is also provided with an internally screw threaded blind hole 47 therein. Intermediate its ends, the shank 46 is provided with a flat 48 thereon although if desired the flat 48 may extend along the whole length of the insert 44. The head 45 and that portion of the shank 46 lying between the head 45 and the flat 48 is provided with a longitudinal groove 49. The head 45 is provided with an internal recess 50 therein. A transducer 51 of the strain gauge type comprising a plurality of thin film strain gauges is provided on the flat 48 of the insert 44. The thin film strain gauge pattern can be deposited on the flat 48 by the procedure and in the manner described above for the depositing of the thin film strain gauge pattern on the bolt 14. Thus, the thin film strain gauge pattern can be provided such as to monitor shear, bending or tensile forces. Leads 52 from the transducer 51 extend through the groove 49 which communicates with the recess 50. The leads 52 are terminated by a four pin transistor header 53 disposed within the recess 50. Heavier leads forming part of a cable 54 are connected with the transistor header 53. The cable 54 extends from the bolt to the display module located within the cab of the goods vehicle. The cable 54 is clamped in position relative to the bolt 40 by means of a cable clamp and seal comprising a sleeve 55, a hollow nut 56, a sealing ring 57, and a washer 58. The sleeve 56 has a screw threaded end portion engaged with the screw threading in the end portion 43 of the bore 41. The opposite end of the sleeve 55 is internally screw threaded and receives the hollow nut 56. Tightening of the hollow nut 56 serves to compress the sealing ring 57 which is radially inwardly compressed to clamp against and seal with the periphery of the cable 54.

In a convenient embodiment (not shown) suitable interface electronic circuitry is provided within the transistor header 53 to amplify the small signals from the transducer 51 so as to provide a relatively large output. Such interface electronic circuitry can conveniently be provided using well known semi-conductor manufacturing techniques.

In the above described embodiment, the insert 44 is press fitted into the bore 41. This produces internal compression stresses within the insert 44 and these can be relieved by applying a tensile force to the insert 44 by means of a smaller bolt (not shown) which is engaged with the screw threaded hole 47 and then removed after compression stress relief has occurred.

Instead of being press fitted into the bore 41, the insert 44 may be designed so as to be shrink fitted therein or even secured therein with suitable adhesive or any other means such that the insert 44 is in intimate contact with the bolt 40 whereby stresses in the bolt 40 are transmitted to the insert 44.

The above described arrangement provides effective protection to the transducer 51 and other delicate parts against accidental damage.

The particular examples describe the transducer as measuring shear stresses or bending stresses associated with the main spring of the vehicle suspension system, however, as has been mentioned earlier, the invention can also be used in suspension systems in which a main spring is augmented by a helper spring. The dotted lines on FIG. 1 are intended to illustrate the arrangement where such a helper spring 61 is included. In this example, the chassis 10 is provided with slipper plates 62 each of which has an extension member 63 normally out of contact with the helper spring 61 when the vehicle is unladen. As the vehicle load increases, there will be a load reached when the helper spring 61 comes into contact with the extension members 63. The extension members 63 are constructed in similar fashion to the bolts 14 associated with the main springs 13 and, in like manner to the arrangements shown in FIG. 3 or 4, have strain gauges mounted thereon.

Where signals are taken from the extension members 63 associated with the slipper plates, these signals are fed via operational amplifiers 32 to the selector switch 33 and, where transducers are used on members associated with the main spring, can be combined with the signals from the main spring members to provide the required load indications.

I claim:

1. A load monitoring arrangement for a vehicle axle comprising a bolt which in use is fixedly mounted on a vehicle body and serves to connect said vehicle body with a resilient suspension part, wherein said bolt has a hollow therein, an insert disposed in the hollow of said bolt so as to be in intimate contact with said bolt, and a transducer provided on said insert so as to monitor the effect of loading forces acting on said bolt, said transducer being disposed within said bolt.

2. An arrangement as claimed in claim 1 wherein said resilient suspension part is the main spring of the vehicle.

3. An arrangement as claimed in claim 1 wherein said resilient suspension part comprises a helper spring and said bolt is connected to said helper spring when the vehicle is laden.

4. An arrangement as claimed in claim 1 wherein said transducer is arranged to monitor shear forces acting on said bolt.

5. An arrangement as claimed in claim 1 wherein said transducer is arranged to monitor bending stress forces acting on said bolt.

6. An arrangement as claimed in claim 1 where the insert and the bolt are formed from the same material.

7. An arrangement as claimed in any one of preceding claims 1-6 wherein said transducer is a plurality of thin film strain gauges.

8. An arrangement as claimed in claim 1 wherein said transducer is a strain gauge device arranged to monitor shear forces acting on the bolt, said strain gauge device being fixed on the insert in such a way that the vehicle body does not act directly on the strain gauge device.

9. A vehicle comprising a body, a plurality of axles, and a resilient suspension part connecting one end of each axle with the vehicle body wherein there is provided a load monitoring arrangement comprising a bolt which is fixedly mounted on the vehicle body and connected with the suspension part so that the body is connected with the suspension part through the intermediary of said bolt, said bolt having a hollow therein, an insert disposed in the hollow of said bolt so as to be in intimate contact with said bolt, and a transducer provided on said insert and within the hollow of said bolt so as to monitor the effect of loading forces acting on said bolt.

* * * * *